United States Patent [19]

Carney

[11] 3,896,031

[45] July 22, 1975

[54] PREPARATION OF COLLOIDAL SOLID SUSPENSIONS IN AQUEOUS SOLUTIONS

[75] Inventor: Leroy L. Carney, Duncan, Okla.

[73] Assignee: Halliburton Company, Duncan, Okla.

[22] Filed: Apr. 20, 1973

[21] Appl. No.: 353,060

[52] U.S. Cl............ 252/8.5 C; 252/311.5; 252/355
[51] Int. Cl......................... C10m 3/34; C10m 3/30
[58] Field of Search .......... 252/8.5 C, 8.5 P, 311.5, 252/355

[56] References Cited
UNITED STATES PATENTS

| | | | |
|---|---|---|---|
| 1,895,775 | 1/1933 | Smith | 252/311.5 |
| 2,442,972 | 6/1948 | Edelstein | 252/311.5 |
| 2,714,582 | 8/1955 | Day | 252/311.5 |
| 2,722,515 | 11/1955 | Reamer | 252/311.5 X |
| 2,782,169 | 2/1957 | Brown et al. | 252/311.5 |
| 2,819,228 | 1/1958 | Dell | 252/311.5 X |
| 3,322,668 | 5/1967 | Fontenot et al. | 252/8.5 C |
| 3,347,788 | 10/1967 | Sohn et al. | 252/8.5 C |
| 3,723,311 | 3/1973 | Lummus et al. | 252/8.5 P X |
| 3,788,406 | 1/1974 | Messenger | 252/8.5 P X |
| R15,944 | 11/1924 | Kirschbraun | 252/311.5 |

*Primary Examiner*—Herbert B. Guynn
*Attorney, Agent, or Firm*—Fred E. Hook; Thomas R. Weaver; John H. Tregoning

[57] ABSTRACT

The present invention relates to the preparation of colloidal suspensions of solids in aqueous solutions, e.g., water-base drilling fluids, in the absence of oil. Colloidal solid materials such as asphaltic solids are rendered directly dispersible in the aqueous solution by novel dispersing agents provided by this invention. Improved aqueous drilling fluids containing colloidal suspensions of asphaltic solids and novel additives for forming such colloidal suspensions in aqueous drilling fluids are also provided by the present invention.

9 Claims, No Drawings

PREPARATION OF COLLOIDAL SOLID SUSPENSIONS IN AQUEOUS SOLUTIONS

Aqueous solutions containing colloidal suspensions of solids are utilized in industry in a variety of applications. For example, various solid materials are often transported from one location to another in pipelines in the form of colloidal suspensions in aqueous liquid carriers. Also, in the oil well drilling industry aqueous or water-base drilling fluids containing colloidal suspensions of various solid materials are utilized.

Both oil-base and water-base drilling fluids are used in subterranean drilling operations, which fluids contain weighting materials and other additives to impart desired properties thereto. In offshore drilling operations, water-base drilling fluids are generally used to minimize pollution in the event the drilling fluids escape into the body of water surrounding the drilling site. In order to improve the performance of such aqueous drilling fluids, namely, to bring about better lubrication of the bit and drill string and reduce hole trouble such as bit balling, heaving shale, hole enlargement, etc., it has heretofore been customary to form a colloidal suspension of asphaltic solids in the drilling fluids. Since colloidal asphaltic solids are neither soluble or directly dispersible in water, in order to form the desired suspensions, it has heretofore been necessary to first add the asphaltic solids to a quantity of oil, e.g., diesel oil, and then combine the oil and solids with the aqueous drilling fluid in a manner such that an oil-in-water emulsion is formed. With the increased emphasis on ecology, i.e., preventing oil contamination of the body of water surrounding off-shore drilling sites, the use of oil to achieve suspension of the asphaltic solids in aqueous drilling fluids is unsatisfactory. Additionally, when the asphaltic solids are suspended in an aqueous drilling fluid by means of the formation of an oil-in-water emulsion, the solids are contained in the internal oil phase of the emulsion and the desired deposit of the asphaltic solids on the walls of the well bore, etc., is restricted.

By the present invention, novel dispersing agents and additives for forming colloidal suspensions of solids in aqueous solutions in the absence of oil are provided. Further, novel aqueous drilling fluids containing colloidal suspensions of asphaltic solids in the absence of oil and methods of preparing such aqueous drilling fluids are provided.

The improved aqueous drilling fluids of the present invention not only obviate the ecology problems attendant heretofore used oil-in-water emulsion drilling fluids, but are more economical to prepare and use as compared to the prior aqueous drilling fluids.

Thus, in one aspect of the present invention, novel dispersing agents and additives containing the dispersing agents are provided for forming colloidal suspensions of solid materials in aqueous solutions and drilling fluids in the absence of oil. In another aspect of the present invention, novel aqueous drilling fluids containing colloidal suspensions of asphaltic solids in the absence of oil are provided as well as methods of preparing such aqueous drilling fluids.

The dispersing agents of the present invention for dispersing colloidal solid materials in aqueous solutions in the absence of oil are preferably comprised of mixtures of oleyl amide and waste lignin liquor, wherein the waste lignin liquor is a product of the sulfite process or the Kraft process used in the wood pulping industry.

While the preferred dispersing agent is produced by combining oleyl amide with waste lignin liquors, amides other than oleyl amides are useful herein. Such amides are prepared from saturated and unsaturated fatty acids having in the range of from about 14 to about 18 carbon atoms per molecule. Such acids include but are not limited to linoleic acid, linolenic acid, stearic acid, palmitic acid, myristic acid and myristoleic acid.

The above described amides can be prepared by various conventional procedures. For example, a fatty acid described above and phosphorus trichloride starting materials can be reacted to form a chloride intermediate which in turn can be reacted with N-methyl taurine to form the amide. The N-methyl taurine can be prepared by reacting sodium bisulfite with ethylene oxide to form an intermediate which is in turn reacted with monomethylamine.

The term "waste lignin liquor" is used herein to mean the waste liquor produced in the processes for pulping wood. In the sulfite process, for example, wood is cooked under pressure with an aqueous liquor containing a sulfite compound and, frequently, sulfurous acid. Sodium bisulfite is generally used as the sulfite compound in the process, but ammonium, calcium or magnesium bisulfite can also be used. During the cooking of the wood which contains lignocellulose, the sulfite compound reacts preferentially with the lignin, liberating the cellulose which is separated in the form of a pulp from the liquor. The liquor remaining after the separation is known as waste sulfite liquor and is an aqueous solution of lignin sulfonic acids, wood sugars and inorganic compounds.

In the preparation of the dispersing agent of the present invention, the waste lignin liquor is preferably mixed with the amide used in an amount in the range of from about 25% to about 75% by weight of the mixture (the amide therefor also being present in the mixture in an amount in the range of from about 25% to about 75% by weight). At waste lignin liquor concentrations above and below this range the effectiveness of the dispersing agent decreases. The mixture can be used in liquid form for dispersing colloidal solid materials in aqueous solutions, but preferably it is dried in a conventional manner such as by spray drying to form a substantially dry solid product.

A preferred dispersing agent of the present invention is a substantially dry product prepared by mixing oleyl amide with waste sulfite liquor, the waste sulfite liquor being present in the mixture in an amount of about 50% by weight thereof, and then spray drying the mixture.

The dispersing agent of this invention can be utilized for dispersing a variety of colloidal solid materials in aqueous solutions in the absence of oil, which solid materials are normally not dispersible in water unless first dispersed in oil, etc. The dispersing agent has a greater affinity for oil than it has for asphaltenes. Accordingly, the addition of oil to an aqueous system containing asphaltenes dispersed by the dispersing agent of this invention causes the asphaltenes to agglomerate thereby rendering the dispersing agent inoperable. Therefore, the addition of oil to an aqueous system utilizing the dispersing agent described herein is not within the scope of this invention.

The novel additives of this invention for forming colloidal suspensions of asphaltic solids in aqueous solutions, e.g., water-base drilling fluids, in the absence of oil are comprised of a mixture of colloidal asphaltic solids and a dispersant comprised of an amide formed from a saturated or unsaturated fatty acid having in the range of from about 14 to about 18 carbon atoms therein, and waste lignin liquor. Preferably, the dry dispersant is present in the additive in an amount in the range of from about 1% to about 50% by weight thereof. At a concentration of the dispersant in the additive below about 1% by weight, inadequate dispersing of the asphaltic solids results, and at concentrations of the dispersant above about 50% by weight excess dispersant is present. A concentration of dispersant in the additive of about 4% by weight of the additive is most preferred.

The asphaltic material useful in preparing the additives of this invention includes any of those bituminous materials used heretofore and known in the prior art such as natural asphalts or those derived from petroleum refining, for example, by steam refining and/or air blowing, etc. The asphaltic material employed herein preferably is a solid at temperatures up to about 260°F. Asphaltic materials which are solids up to about 260°F can be conveniently subjected to size reduction operations to produce the colloidal particles useful herein.

A preferred additive comprises colloidal asphaltic solids and a dried dispersant present in the additive in an amount in the range of from about 1% to about 50% by weight of the additive, said dispersant being comprised of a mixture of oleyl amide and waste lignin liquor, the waste lignin liquor being present in the dispersant in an amount in the range of from about 25% to about 75% by weight thereof.

The most preferred additive of this invention for forming colloidal suspensions of asphaltic solids in aqueous solutions in the absence of oil comprises colloidal asphaltic solids and a dried dispersant present in the additive in an amount of about 4% by weight of the additive, said dispersant being comprised of a mixture of oleyl amide and waste sulfite liquor, the waste sulfite liquor being present in the dispersant in an amount of about 50% by weight thereof prior to drying.

In utilizing the above-described additives of this invention for forming aqueous drilling fluids having colloidal suspensions of asphaltic solids therein in the absence of oil, the dry additive is combined directly with the aqueous drilling fluid in an amount in the range of from about 0.5 to 2% by weight thereof. Generally, the additive is combined with the drilling fluid while the drilling fluid is being circulated which causes the immediate dispersing of the colloidal asphaltic solids in the drilling fluid. At an additive concentration in the drilling fluid below about 0.5% by weight, little improvement in the properties of the drilling fluid is realized. Concentrations of the additive above about 2% by weight in the drilling fluid do not add appreciable to the benefits achieved by the additive.

The aqueous drilling fluids formed using the additives of the present invention are superior to heretofore known and used aqueous drilling fluids in that they do not contain oil and the suspended asphaltic materials contained in the drilling fluids readily plate out on the solids being drilled and on the walls of the well bore, resulting in better fluid loss control as well as improvement in the other benefits mentioned above relating to the use of asphaltic solids in drilling fluids. In addition, the improved drilling fluids of the present invention are more economical to prepare and use as compared to heretofore used oil-in-water emulsion type drilling fluids due to oil and an emulsifying agent not being required.

The present invention, therefore, is well adapted to attain the ends and advantages mentioned as well as those inherent therein. As will be understood by those skilled in the art, considerably variation in the relative amounts and components of the dispersing agent, additives and improved drilling fluids of the invention can be made, and the invention is not to be limited to the specific examples which are given herein for the purpose of disclosure.

What is claimed is:

1. An additive for forming a colloidal suspension of asphaltic solids in an aqueous solution in the absence of oil which comprises:

colloidal asphaltic solids; and a dispersant present in said additive in an amount in the range of from about 1% to about 50% by weight thereof consisting of a mixture of waste lignin liquor present in an amount in the range of from about 25% to about 75% by weight of said mixture and an amide present in an amount in the range of from about 25% to about 75% by weight of said mixture, said amide being formed by reacting a saturated or unsaturated fatty acid having in the range of from about 14 to about 18 carbon atoms with N-methyl taurine.

2. The additive of claim 1 wherein the amide is oleyl amide.

3. The additive of claim 2 wherein the dispersant is further characterized to be a substantially dry solid prepared by drying the oleyl amide-waste lignin liquor mixture.

4. The additive of claim 3 wherein the dry dispersant is present in said additive in an amount of about 4% by weight thereof.

5. The additive of claim 4 wherein the oleyl amide is present in said dispersant in an amount of about 50% by weight thereof and the waste lignin liquor is waste sulfite liquor present in the dispersant prior to drying in an amount of about 50% by weight of the dispersant.

6. An additive for forming a colloidal suspension of asphaltic solids in an aqueous solution in the absence of oil which comprises:

colloidal asphaltic solids; and a dispersant present in said additive in an amount in the range of from about 1% to about 50% by weight of said additive, said dispersant being prepared by mixing in about equal amounts by weight the oleyl amide formed by reacting oleic acid with N-methyl taurine and waste sulfite liquor, and then drying said mixture.

7. The additive of claim 6 wherein the dried dispersant is present therein in an amount of about 4% by weight thereof.

8. An improved aqueous drilling fluid containing a colloidal suspension of asphaltic solids in the absence of oil which comprises:

water;

an additive consisting of colloidal asphaltic solids and a dried mixture of an amide and waste lignin liquor, the amide being present in said mixture in an amount in the range of from about 25% to about 75% by weight and being formed by reacting a saturated or unsaturated fatty acid having in the range of from about 14 to about 18 carbon atoms with N-methyl taurine, the waste lignin liquor being present in said mixture in an amount in the range of from about 25% to about 75% by weight prior to drying, and the dried amide-waste lignin liquor mixture being present in said additive in an amount in the range of from about 1% to about 50% by weight of said additive; and said additive being present in said drilling fluid in an amount in the range of from about 0.5% to about 2% by weight of said water.

9. An improved aqueous drilling fluid containing a colloidal suspension of asphaltic solids in the absence of oil which comprises:

water;

an additive consisting of colloidal asphaltic solids and a dispersant prepared by mixing oleyl amide with waste sulfite liquor in equal amounts by weight and then drying said mixture, the oleyl amide being formed by reacting oleic acid with N-methyl taurine, and the dispersant being present in said additive in an amount of about 4% by weight of said additive; and said additive being present in said drilling fluid in an amount in the range of from about 0.5% to about 2% by weight of the water present therein.

* * * * *